US010969585B2

(12) United States Patent
Tervo

(10) Patent No.: US 10,969,585 B2
(45) Date of Patent: Apr. 6, 2021

(54) WAVEGUIDE DISPLAY WITH INCREASED UNIFORMITY AND REDUCED CROSS-COUPLING BETWEEN COLORS

(71) Applicant: Microsoft Technology Licensing, LLC, Redmond, WA (US)

(72) Inventor: Jani Kari Tapio Tervo, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/795,738

(22) Filed: Oct. 27, 2017

(65) Prior Publication Data

US 2018/0292653 A1   Oct. 11, 2018

Related U.S. Application Data

(60) Provisional application No. 62/482,566, filed on Apr. 6, 2017.

(51) Int. Cl.
*G02B 5/18* (2006.01)
*G02B 27/01* (2006.01)
(Continued)

(52) U.S. Cl.
CPC ....... *G02B 27/0172* (2013.01); *G02B 5/1819* (2013.01); *G02B 6/0016* (2013.01);
(Continued)

(58) Field of Classification Search
CPC ............ G02B 27/0101; G02B 27/0081; G02B 27/0172; G02B 5/1814; G02B 27/4205;
(Continued)

(56) References Cited

U.S. PATENT DOCUMENTS 6,553,165 B1   4/2003   Temkin et al.
6,750,996 B2   6/2004   Jagt et al.
(Continued)

FOREIGN PATENT DOCUMENTS

CN   101103297 A   1/2008
CN   101589326 A   11/2009
(Continued)

OTHER PUBLICATIONS

"International Search Report & Written Opinion Issued in PCT Application No. PCT/US18/024699", dated Oct. 24, 2018, 15 Pages.
(Continued)

*Primary Examiner* — Audrey Y Chang
(74) *Attorney, Agent, or Firm* — Mark K. Young; Mayer & Williams, PC

(57) ABSTRACT

A waveguide display includes multiple diffractive optical elements (DOEs) that are configured to in-couple image light, provide expanded exit pupil in two directions, and out-couple the image light to a user. An in-coupling DOE is configured to split the full field of view (FOV) of the image light into left and right portions. The left and right FOV portions are respectively propagated laterally in left and right directions in intermediate DOEs which comprise upper and lower portions. The intermediate DOEs provide for exit pupil expansion in a horizontal direction while coupling light to an out-coupling DOE. The out-coupling DOE provides for exit pupil expansion in a vertical direction and out-couples image light with expanded exit pupil for the full FOV. The intermediate DOE portions are configured to steer image light back towards the center of the waveguide to avoid dark areas or stripes in portions of the out-coupling DOE.

6 Claims, 19 Drawing Sheets

(51) Int. Cl.
*F21V 8/00* (2006.01)
*G02B 27/00* (2006.01)
*G02B 6/34* (2006.01)
*G02B 27/42* (2006.01)

(52) U.S. Cl.
CPC ......... *G02B 6/0038* (2013.01); *G02B 6/0076* (2013.01); *G02B 6/34* (2013.01); *G02B 27/0081* (2013.01); *G02B 27/4205* (2013.01); *G02B 2027/0125* (2013.01); *G02B 2027/0138* (2013.01)

(58) Field of Classification Search
CPC ...... G02B 6/34; G02B 6/0076; G02B 6/0016; G02B 6/0038; G02B 2027/0138; G02B 2027/0125
USPC .......................................... 359/34, 567, 569
See application file for complete search history.

(56) References Cited

U.S. PATENT DOCUMENTS

| | | | |
|---|---|---|---|
| 8,233,204 | B1 | 7/2012 | Robbins et al. |
| 8,466,953 | B2 | 6/2013 | Levola |
| 8,508,848 | B2 | 8/2013 | Saarikko |
| 8,989,535 | B2 | 3/2015 | Robbins |
| 9,274,338 | B2 | 3/2016 | Robbins et al. |
| 9,791,703 | B1 | 10/2017 | Vallius |
| 2006/0126181 | A1 | 6/2006 | Levola |
| 2010/0214659 | A1 | 8/2010 | Levola |
| 2010/0296163 | A1* | 11/2010 | Saarikko .............. G02B 5/1814 359/567 |
| 2011/0019258 | A1* | 1/2011 | Levola ................. G02B 6/0035 359/238 |
| 2011/0019874 | A1* | 1/2011 | Jarvenpaa .............. A61B 3/113 382/103 |
| 2011/0038049 | A1 | 2/2011 | Vallius et al. |
| 2013/0044376 | A1* | 2/2013 | Valera ................. G02B 27/0081 359/567 |
| 2013/0250430 | A1 | 9/2013 | Robbins et al. |
| 2014/0140091 | A1 | 5/2014 | Vasylyev |
| 2014/0140653 | A1 | 5/2014 | Brown et al. |
| 2014/0140654 | A1 | 5/2014 | Brown et al. |
| 2014/0218801 | A1 | 8/2014 | Simmonds et al. |
| 2014/0300966 | A1 | 10/2014 | Travers et al. |
| 2015/0016777 | A1 | 1/2015 | Abovitz et al. |
| 2015/0086163 | A1 | 3/2015 | Valera et al. |
| 2015/0160529 | A1 | 6/2015 | Popovich et al. |
| 2018/0292653 | A1 | 10/2018 | Tervo |

FOREIGN PATENT DOCUMENTS

| | | |
|---|---|---|
| CN | 101688977 A | 3/2010 |
| CN | 104035157 A | 9/2014 |
| CN | 104040410 A | 9/2014 |
| CN | 104614870 A | 5/2015 |
| EP | 2259048 A1 | 12/2010 |
| EP | 2887121 A1 | 6/2015 |
| GB | 2529003 A | 2/2016 |
| WO | 2014091204 A1 | 6/2014 |
| WO | 2016054092 A1 | 4/2016 |
| WO | 2016130359 A1 | 8/2016 |
| WO | 2017003795 A1 | 1/2017 |

OTHER PUBLICATIONS

Han, et al., "Portable waveguide display system with a large field of view by integrating freeform elements and volume holograms", In Journal of Optics Express vol. 23, Issue 3, Feb. 9, 2015, pp. 3534-3549. (16 pages total).
"SBG Labs Delivers Transparent Display With Large Exit Pupil and Wide Fov for HMDs", Published on: Dec. 2012 Available at: http://www.digilens.com/sbg-labs-delivers-transparent-display-with-large-exit-pupil-and-wide-fov-for-hmds/ (5 pages total).
Wang, et al., "Compact slanted grating couplers", In Journal of Optics Express, vol. 12, Issue 15, Jul. 26, 2004, pp. 3313-3326. (14 pages total).
"Office Action Issued in European Patent Application No. 18718065.8", dated Jul. 22, 2020, 3 Pages.
"First Office Action and Search Report Issued in Chinese Patent Application No. 201880022935.6", dated Jan. 20, 2021, 23 Pages.

\* cited by examiner

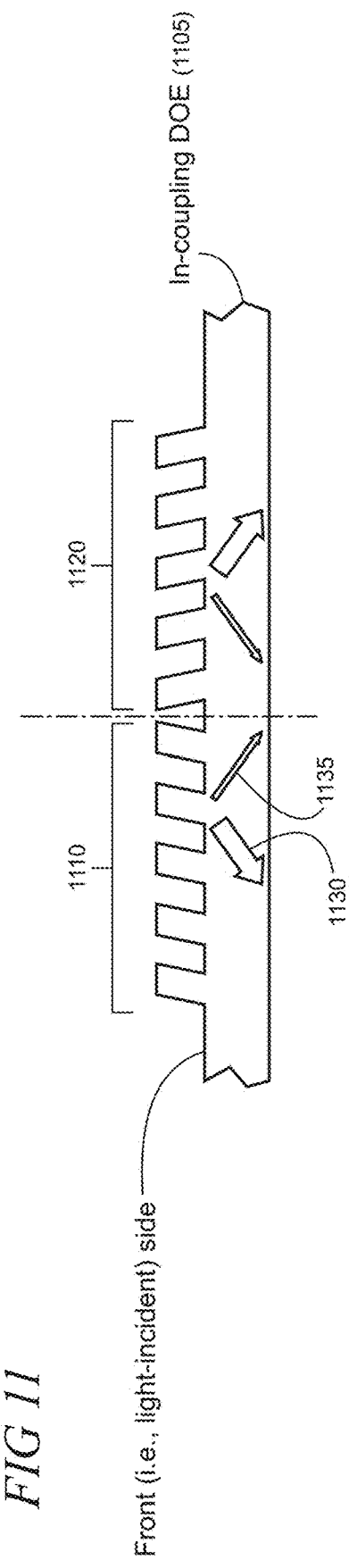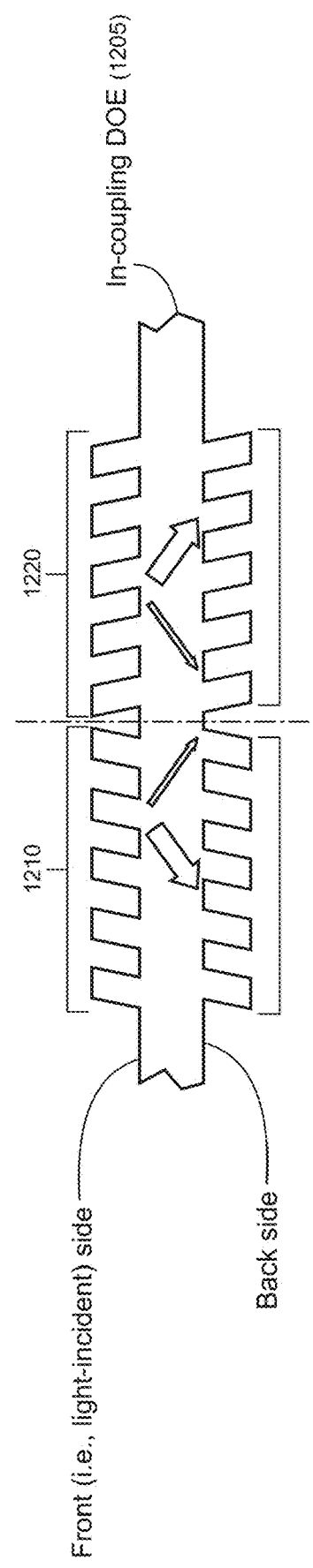

WAVEGUIDE DISPLAY WITH INCREASED UNIFORMITY AND REDUCED CROSS-COUPLING BETWEEN COLORS

STATEMENT OF RELATED APPLICATIONS

This application claims benefit and priority to U.S. Provisional Application Ser. No. 62/482,566 filed Apr. 6, 2017, entitled "Waveguide Display with Increased Uniformity and Reduced Cross-Coupling Between Colors" which is incorporated herein by reference in its entirety.

BACKGROUND

Diffractive optical elements (DOEs) are optical elements with a periodic structure that are commonly utilized in applications ranging from bio-technology, material processing, sensing, and testing to technical optics and optical metrology. By incorporating DOEs in an optical field of a laser or emissive display, for example, the light's "shape" can be controlled and changed flexibly according to application needs.

SUMMARY

A waveguide display includes multiple diffractive optical elements (DOEs) that are configured to in-couple incident image light from an imager, provide expanded exit pupil in two directions, and out-couple the image light to a user in a near-eye optical display system. An in-coupling DOE is configured to split the full field of view (FOV) of the image light into left and right portions. The left and right FOV portions are respectively propagated laterally in left and right directions in intermediate DOEs which comprise upper and lower portions. The intermediate DOEs provide for exit pupil expansion in a first (e.g., horizontal) direction while coupling light to an out-coupling DOE. The out-coupling DOE provides for exit pupil expansion in a second (e.g., vertical) direction and out-couples image light out of the waveguide with expanded exit pupil for the full FOV. The intermediate DOE portions are configured to steer image light back towards the center of the waveguide to avoid dark areas or stripes in the part of the out-coupling DOE that is located below the in-coupling DOE.

The waveguide display may further be configured to selectively couple image light downwards in the waveguide without cross-coupling between light components in the waveguide which comprises multiple waveguide plates to support an RGB (red, green, blue) color model. For example, the in-coupling DOE is configured as a two-sided grating having different grating vectors on each surface to in-couple incident image light and steer the in-coupled image light for the first diffraction order downward in the waveguide without downward coupling of zeroth diffraction order light which is evanescent in the waveguide. Since light must go through the first diffractive order, which is evanescent for red light in the green waveguide plate, the red light is not coupled downward. This selective coupling reduces the cross-coupling of red image light into the green waveguide plate within a central portion of the FOV.

In one illustrative embodiment, the grating vectors in the upper right and lower left intermediate DOEs have the same or similar directions to enable image light to be spread towards the center of the waveguide to reduce dark areas or stripes. In another illustrative embodiment, lower portions of the left and right intermediate DOEs may be combined into a single or two-sided grating. The first surface has a grating vector with the same or similar direction as that of the top right intermediate DOE while the second, opposite surface has a grating vector with the same or similar direction as that of the top intermediate DOE. Alternatively, the combined grating may be configured as a single-sided or two-sided crossed (i.e., two-dimensional) grating.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 11 shows an edge view of a first illustrative in-coupling DOE;

FIG. 12 shows an edge view of a second illustrative in-coupling DOE;

Like reference numerals indicate like elements in the drawings. Elements are not drawn to scale unless otherwise indicated.

DETAILED DESCRIPTION

Figure 1:
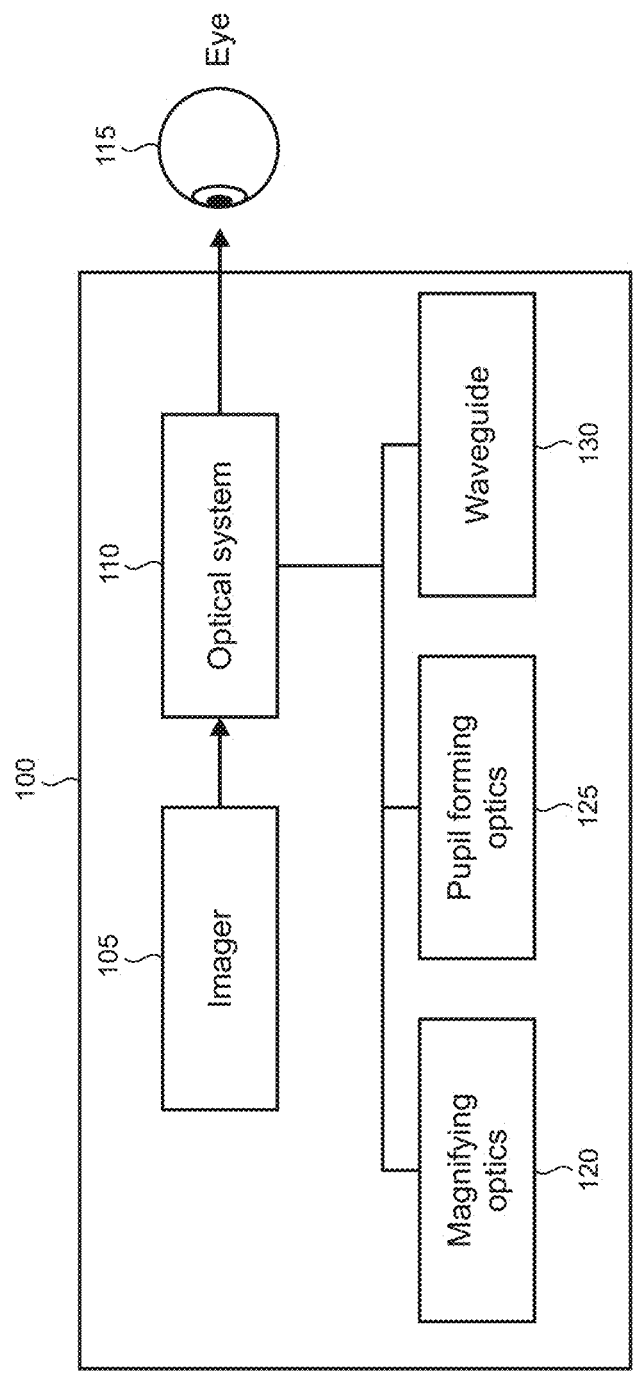
FIG. 1 shows a block diagram of an illustrative near-eye display system.

FIG. 1 shows a block diagram of an illustrative near-eye display system 100 which may incorporate a combination of diffractive optical elements (DOEs) that provide in-coupling of incident light into a waveguide, exit pupil expansion in two directions, and out-coupling of light out of the waveguide. Near-eye display systems are often used, for example, in head mounted display (HMD) devices in industrial, commercial, and consumer applications. Other devices and systems may also use near-eye systems, as described below. The near-eye display system 100 is an example that is used to provide context and illustrate various features and aspects of the present waveguide display with increased uniformity and reduced cross-coupling between colors.

System 100 may include one or more imagers (representatively indicated by reference numeral 105) that work with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 105 may also include mirrors and other components that enable a virtual display to be composed and provide one or more input optical beams to the optical system. The optical system 110 can typically include magnifying optics 120, pupil forming optics 125, and one or more waveguides 130. The imager 105 may include or incorporate an illumination unit and/or light engine (not shown) that may be configured to provide illumination in a range of wavelengths and intensities in some implementations.

In a near-eye display system the imager does not actually shine the images on a surface such as a glass lens to create the visual display for the user. This is not feasible because the human eye cannot focus on something that is that close. Rather than create a visible image on a surface, the near-eye display system 100 uses the pupil forming optics 125 to form a pupil and the eye 115 acts as the last element in the optical chain and converts the light from the pupil into an image on the eye's retina as a virtual display.

Figure 2:
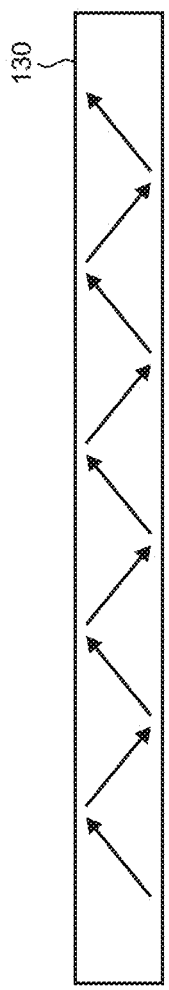
FIG. 2 shows propagation of light in a waveguide by total internal reflection (TIR)

The waveguide 130 facilitates light transmission between the imager and the eye. One or more waveguides can be utilized in the near-eye display system because they are transparent and because they are generally small and lightweight (which is desirable in applications such as HMD devices where size and weight is generally sought to be minimized for reasons of performance and user comfort). For example, the waveguide 130 can enable the imager 105 to be located out of the way, for example, on the side of the user's head or near the forehead, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

Figure 3:
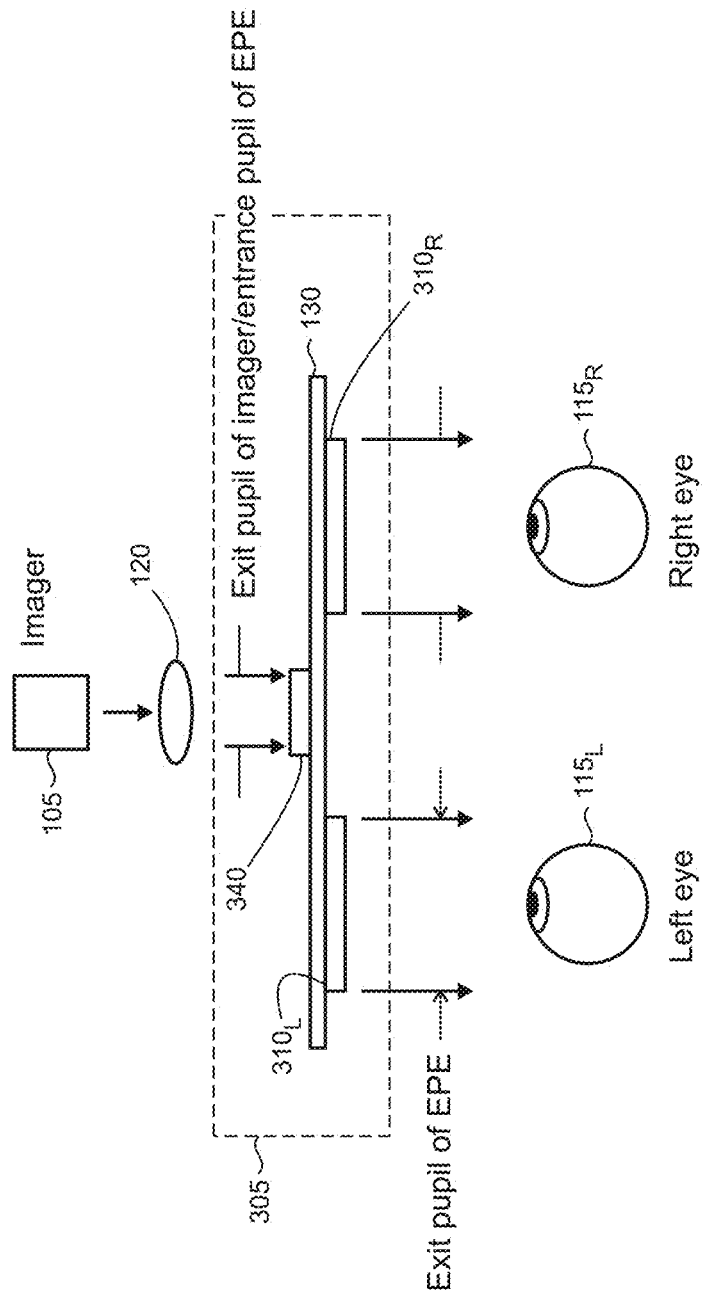
FIG. 3 shows a view of an illustrative exit pupil expander.

FIG. 3 shows a view of an illustrative exit pupil expander (EPE) 305. EPE 305 receives an input optical beam from the imager 105 through optics 120 (e.g., magnifying and/or collimating optics) as an entrance pupil to produce one or more output optical beams with expanded exit pupil in one or two directions relative to the exit pupil of the imager (in general, the input may include more than one optical beam which may be produced by separate sources). The expanded exit pupil typically facilitates a virtual display to be sufficiently sized to meet the various design requirements such as image resolution, field of view, and the like of a given optical system while enabling the imager and associated components to be relatively light and compact.

The EPE 305 is configured, in this illustrative example, to support binocular operation for both the left and right eyes which may support stereoscopic viewing. Components that may be utilized for stereoscopic operation such as scanning mirrors, lenses, filters, beam splitters, MEMS devices, or the like are not shown in FIG. 3 for sake of clarity in exposition. The EPE 305 utilizes two out-coupling gratings, $310_L$ and $310_R$, that are supported on a waveguide 130 and a central in-coupling grating 340. The in-coupling and out-coupling gratings may be configured using multiple DOEs, as described below. While the EPE 305 is depicted as having a planar configuration, other shapes may also be utilized including, for example, curved or partially spherical shapes, in which case the gratings disposed thereon are non-co-planar.

Figure 4:
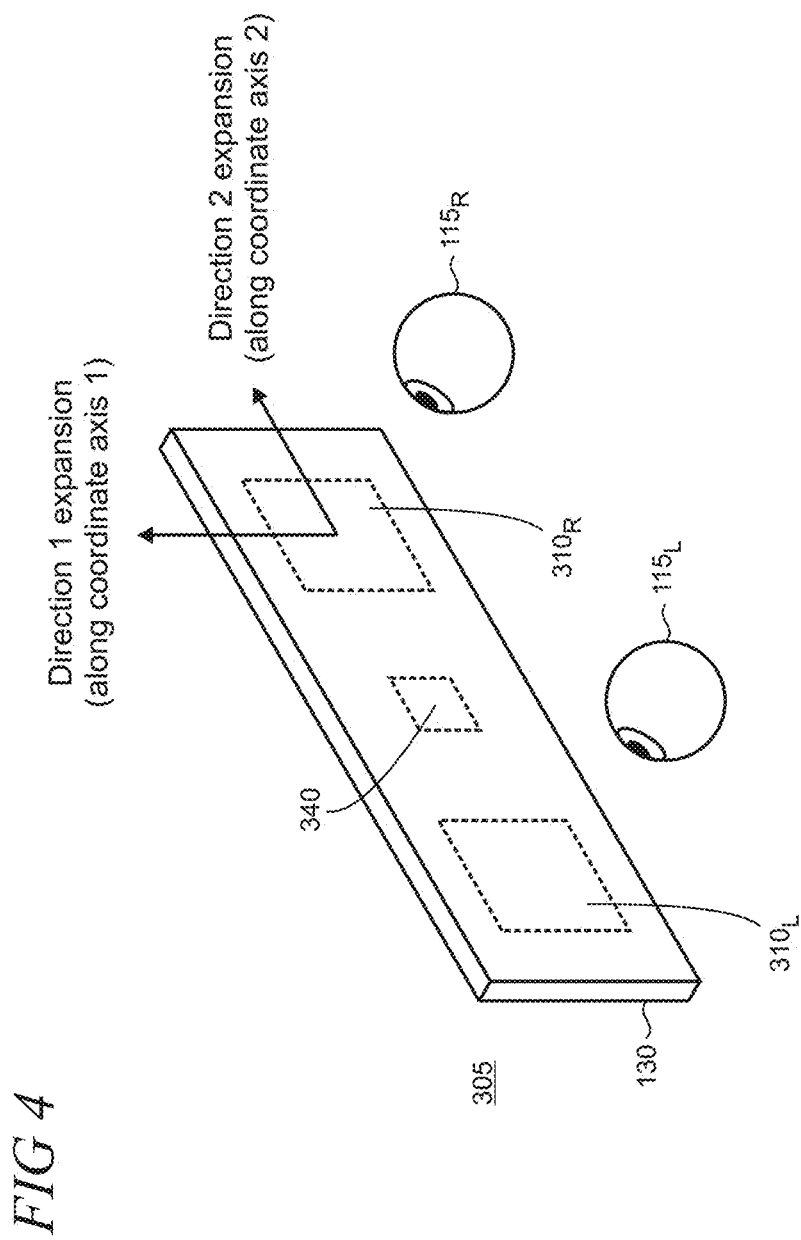
FIG. 4 shows a view of the illustrative exit pupil expander in which the exit pupil is expanded along two directions.
Figure 5:
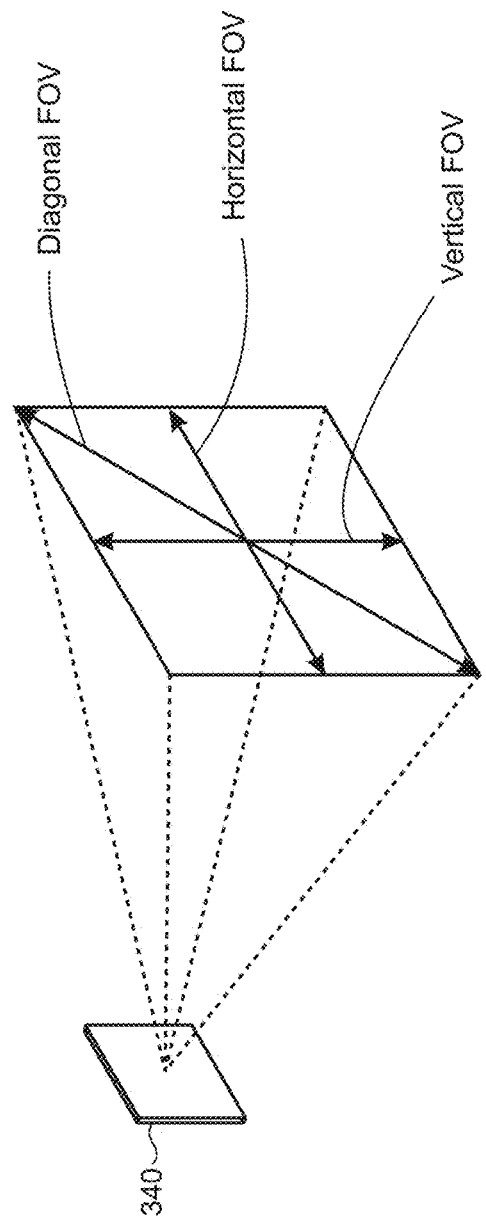
FIG. 5 shows an illustrative input pupil to an exit pupil expander in which a field of view (FOV) is described by angles in horizontal, vertical, or diagonal orientations.
Figure 6:
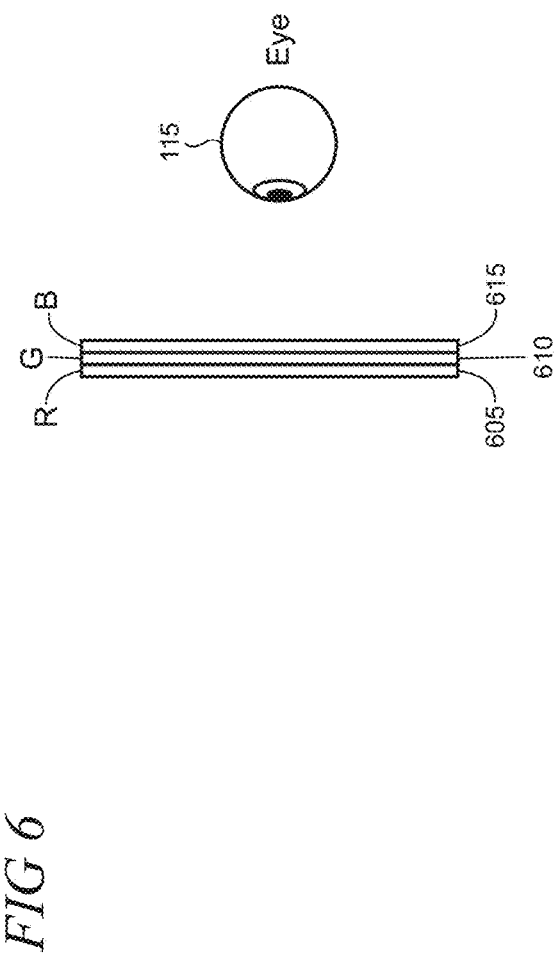
FIG. 6 shows illustrative waveguide plates that support propagation of different wavelengths of light as components of an RGB (red, green, blue) color model.

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "left," "right," "direction," "horizontal," and "vertical" are used primarily to establish relative orientations in the illustrative examples shown and described herein for ease of description. These terms may be intuitive for a usage scenario in which the user of the near eye display device is upright and forward facing, but less intuitive for other usage scenarios. The listed terms are not to be construed to limit the scope of the configurations (and usage scenarios therein) of near-eye display features utilized in the present waveguide display. The entrance pupil to the EPE 305 at the in-coupling grating 340 is generally described in terms of FOV, for example, using horizontal FOV, vertical FOV, or diagonal FOV as shown in FIG. 5.

The present waveguide display may be arranged with color capabilities using an RGB (red, green, blue) color model. Accordingly, the waveguide display may be configured using three layers 605, 610, and 615 using a discrete waveguide plate to propagate each of red, green, and blue image light. In alternative arrangements, two layers may be utilized in which red light is propagated in one waveguide plate and mixed blue and green light is propagated in another waveguide plate.

Figure 7:
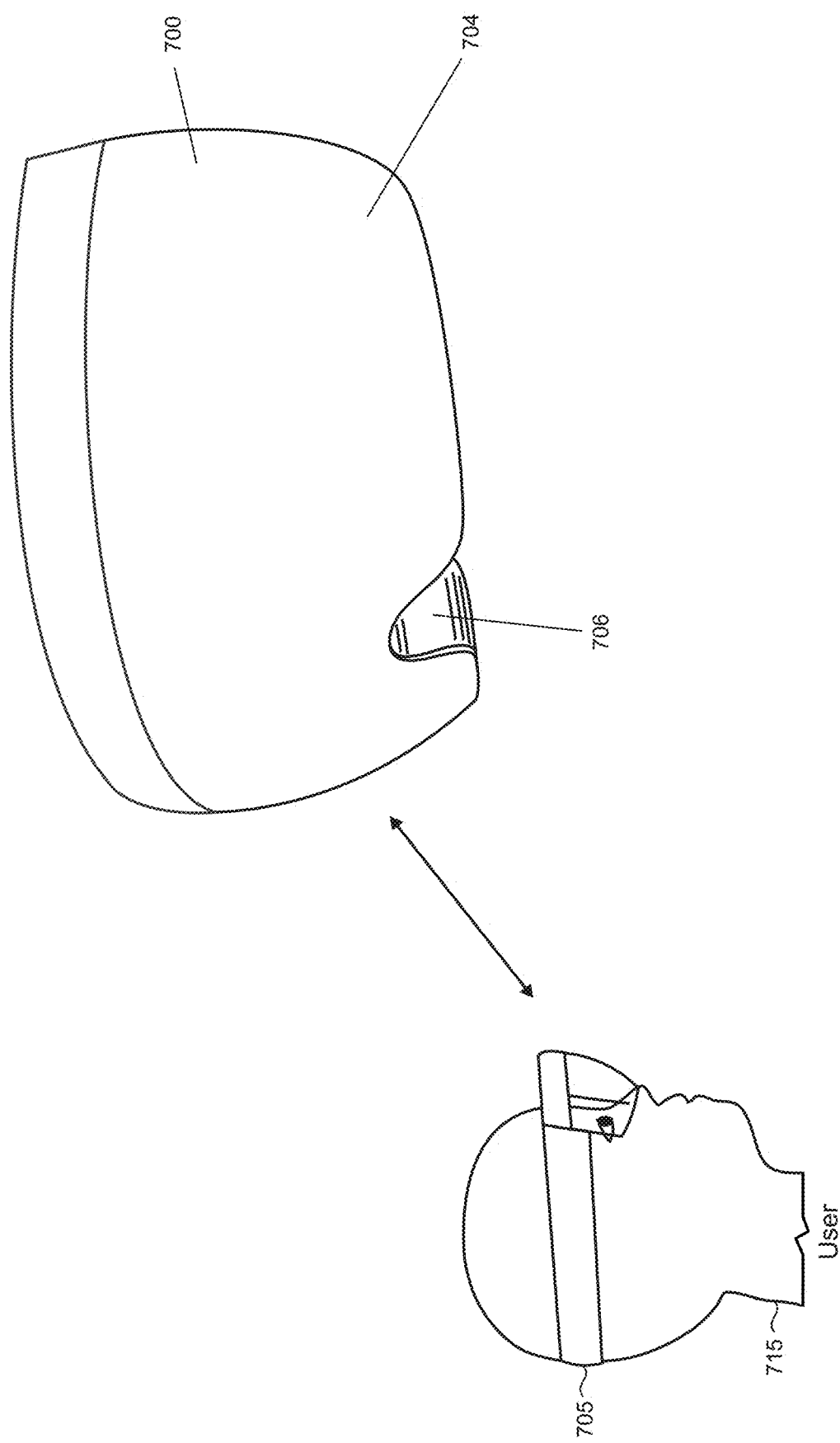
FIG. 7 shows a pictorial front view of a sealed visor that may be used as a component of a head mounted display (HMD) device.

Turning now to various implementation details of the present waveguide display, FIG. 7 shows an illustrative example of a visor 700 that incorporates an internal near-eye display system that is used in a head mounted display (HMD) device 705 worn by a user 715. The visor 700, in this example, is sealed to protect the internal near-eye display system. The visor 700 typically interfaces with other components of the HMD device (not shown) such as head mounting/retention systems and other subsystems including sensors, power management, controllers, etc., as illustratively described in conjunction with FIGS. 24 and 25. Suitable interface elements (not shown) including snaps, bosses, screws and other fasteners, etc. may also be incorporated into the visor 700.

The visor 700 includes see-through front and rear shields, 704 and 706 respectively, that can be molded using transparent materials to facilitate unobstructed vision to the optical displays and the surrounding real world environment. Treatments may be applied to the front and rear shields such as tinting, mirroring, anti-reflective, anti-fog, and other coatings, and various colors and finishes may also be utilized. The front and rear shields are affixed to a chassis 805 shown in the disassembled view in FIG. 8.

The sealed visor 700 can physically protect sensitive internal components, including a near-eye display system 802 (shown in FIG. 8) when the HMD device is used in operation and during normal handling for cleaning and the like. The near-eye display system 802 includes left and right optical displays 810 and 815 that respectively provide virtual world images to the user's left and right eyes. The visor 700 can also protect the near-eye display system 802 from environmental elements and damage should the HMD device be dropped or bumped, impacted, etc.

Figure 8:
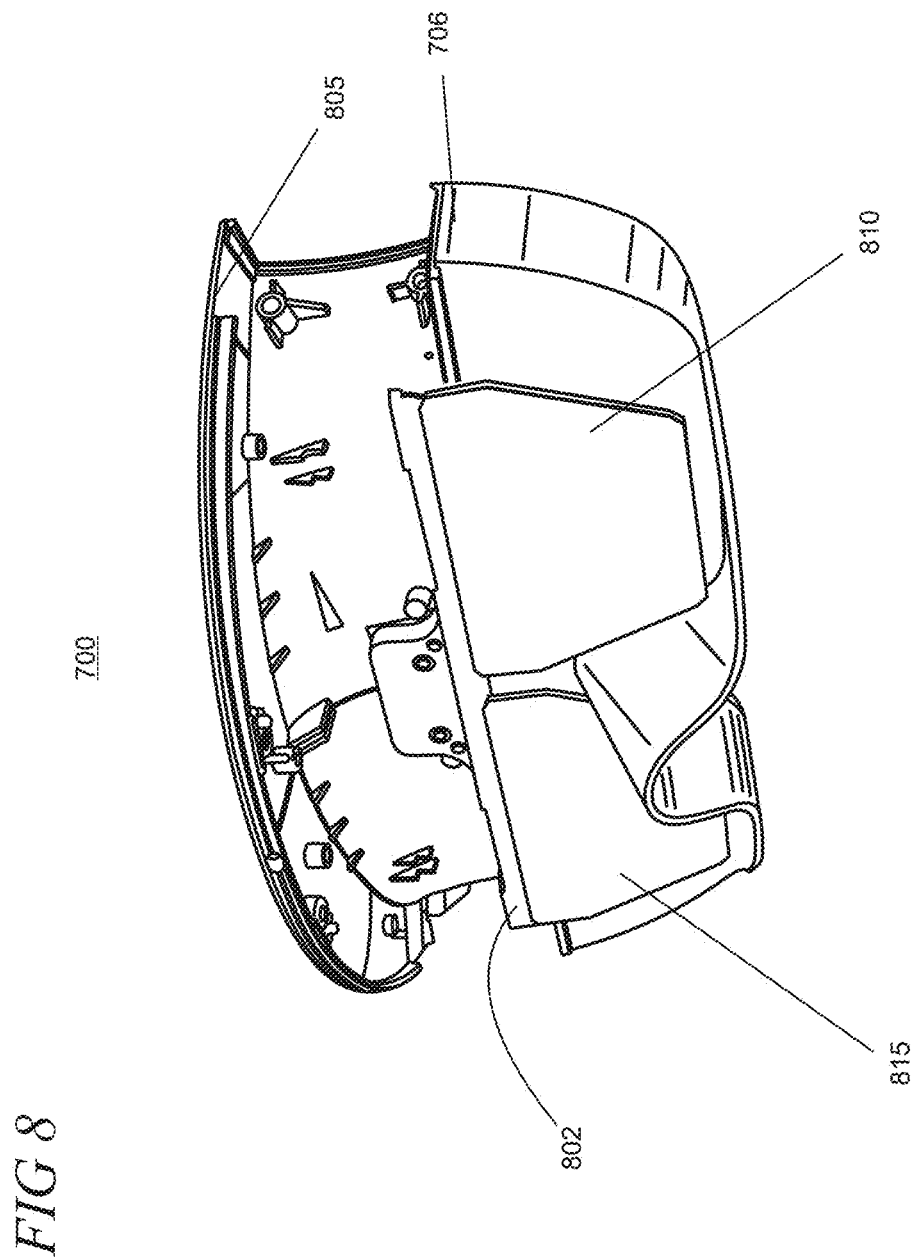
FIG. 8 shows a partially disassembled view of the sealed visor.

As shown in FIG. 8, the rear shield 706 is configured in an ergonomically suitable form to interface with the user's nose, and nose pads and/or other comfort features can be included (e.g., molded-in and/or added-on as discrete components). The sealed visor 700 can also incorporate some level of optical diopter curvature (i.e., eye prescription) within the molded shields in some cases.

Figure 9:
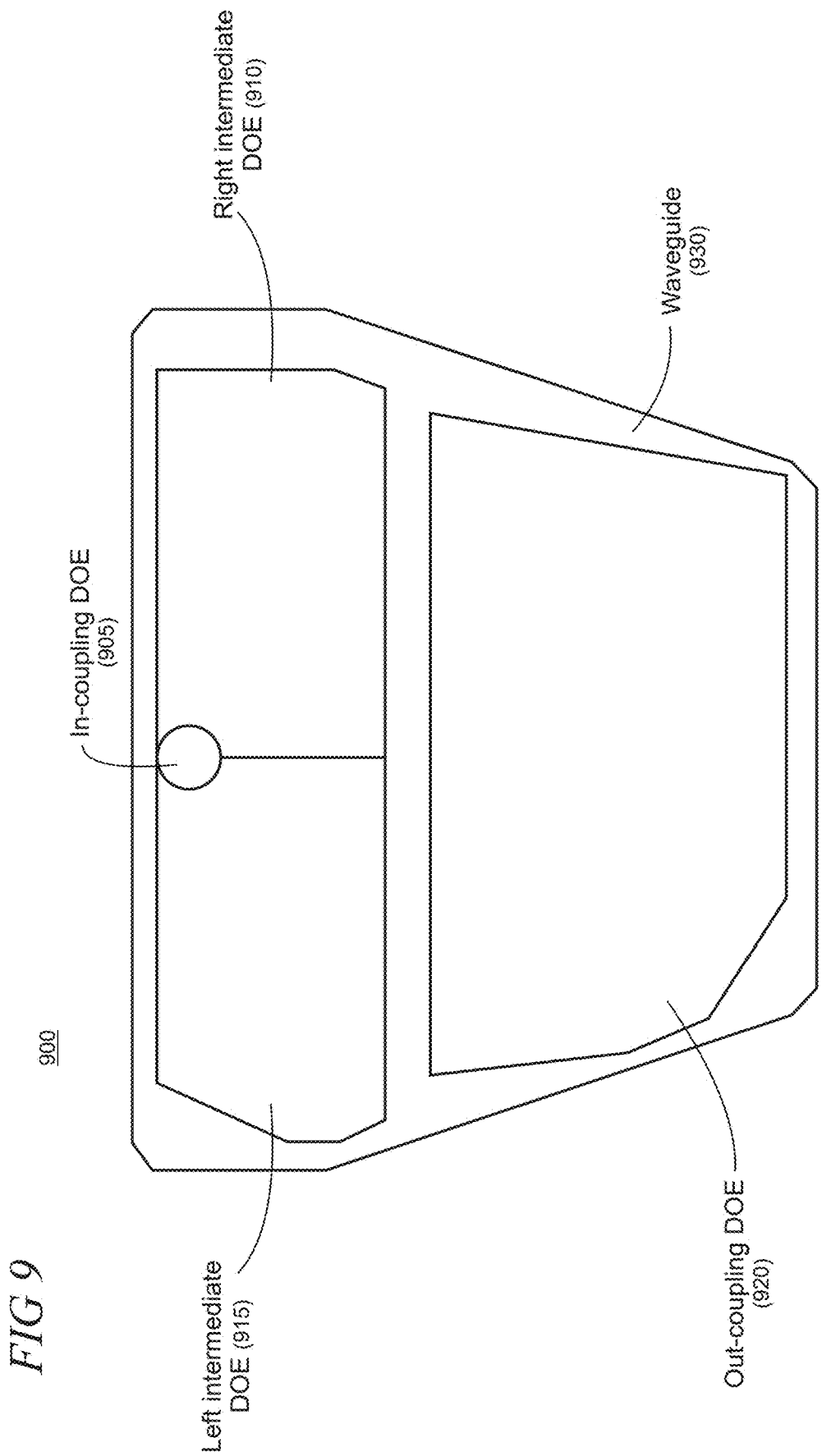
FIGS. 9 and 10 show an illustrative arrangement of diffractive optical elements (DOEs) configured for in-coupling, exit pupil expansion, and out-coupling that provides an extended field of view (FOV)

FIG. 9 shows an illustrative optical display 900 having multiple DOEs that may be used with, or incorporated as a part of, a waveguide 930 to provide in-coupling, expansion of the exit pupil in two directions, and out-coupling. The optical display 900 may be utilized in an exit pupil expander that is included in the near eye display system 802 (FIG. 8) to provide virtual world images to one of the user's eyes. Each DOE is an optical element comprising a periodic structure that can modulate various properties of light in a periodic pattern such as the direction of optical axis, optical path length, and the like.

The FOV is split into two portions—a left portion and a right portion—at the in-coupling DOE 905. Each of the left and right portions uses an FOV that can propagate within the DOEs without leakage. The left and right portions are then optically stitched together at an out-coupling DOE 920 to provide an extended FOV for the virtual images that are out-coupled from the display 900 to the user's eye. Thus, in one non-limiting illustrative example, the diagonal FOV of each of the left and right portions may be 30 degrees and the extended FOV of the optically stitched images is 60 degrees.

A left intermediate DOE 915 extends from the center of the waveguide 930 to its left edge. A right intermediate DOE 910 extends from the center to the right edge of the waveguide 930. Each of the left and right intermediate DOEs expands the exit pupil in a first direction along a first coordinate axis. The left and right intermediate DOEs may both be disposed on the same side of the waveguide. In alternative implementations, the left and right intermediate DOEs can be disposed on the opposite sides of the waveguide. The left and right intermediate DOEs can also overlap in some implementations. The left and right intermediate DOEs 915 and 910 couple light between the in-coupling DOE 905 and the single out-coupling DOE 920 that is centrally located towards the bottom portion of the waveguide 930, as shown. The out-coupling DOE 920 expands the exit pupil in a second direction along a second coordinate axis and couples light out of the waveguide to the user's eye.

Figure 10:
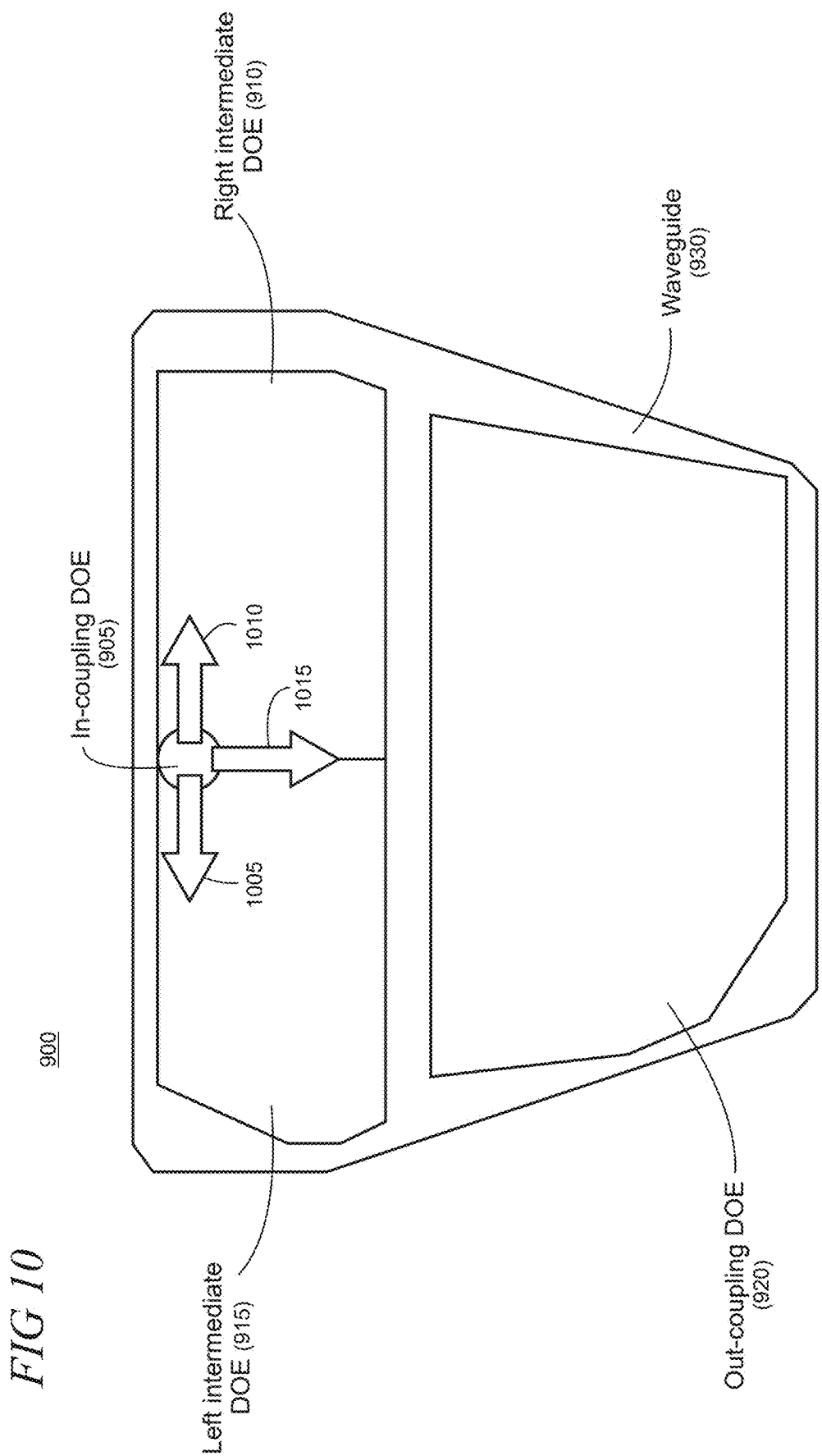

As shown in FIG. 10, the partial FOVs are propagated left and right (as respectively indicated by reference numerals 1005 and 1010) and the full FOV is propagated downward (as indicated by reference numeral 1015). For example, the in-coupling DOE 905 may include linear grating features on one side which couples incident image light to the left and right, as well as linear grating features on the opposite side which couple light downwards. Alternatively, crossed (i.e., two-dimensional) grating features may be used on one or both surfaces of the in-coupling DOE 905 to couple light both sideways and downwards.

While the approach shown in FIG. 10 works satisfactorily for a single waveguide plate, when two or three waveguide plates are utilized in support of the RGB color model, quite significant cross-coupling between colors can occur which can decrease image quality. In particular, parameters describing display uniformity and MTF (modulation transfer function) are typically sub-optimal. The root cause of the cross-coupling is direct coupling by the in-coupling DOE downwards in which red light cross-couples into the waveguide plate for green light to cause the MTF degradation. Most of the red light, especially around the center of the FOV, has an evanescent diffraction order when coupled sideways, but is propagating when coupled downwards. Accordingly, the present waveguide display is configured to avoid direct coupling of image light downward.

The present waveguide display can utilize grating profiles as shown in FIGS. 11 and 12 for the in-coupling DOE. FIG. 11 shows an edge view of a single-sided in-coupling DOE 1105 which is split into two portions 1110 and 1120 that have slanted grating features that are slanted in opposite directions. This "split-slant" configuration typically provides enhanced coupling efficiency when coupling light towards the lateral edges of the in-coupling DOE, as representatively indicated by arrows 1130 and 1135 where the arrow width indicates relative intensity. FIG. 12 shows split-slant grating features 1210 and 1220 on both sides of a two-sided in-coupling DOE 1205. Other grating features may be utilized in alternative implementations for in-coupling, including, for example, refraction index-modulated, refraction index-switched, or polarization gratings.

Figure 13:
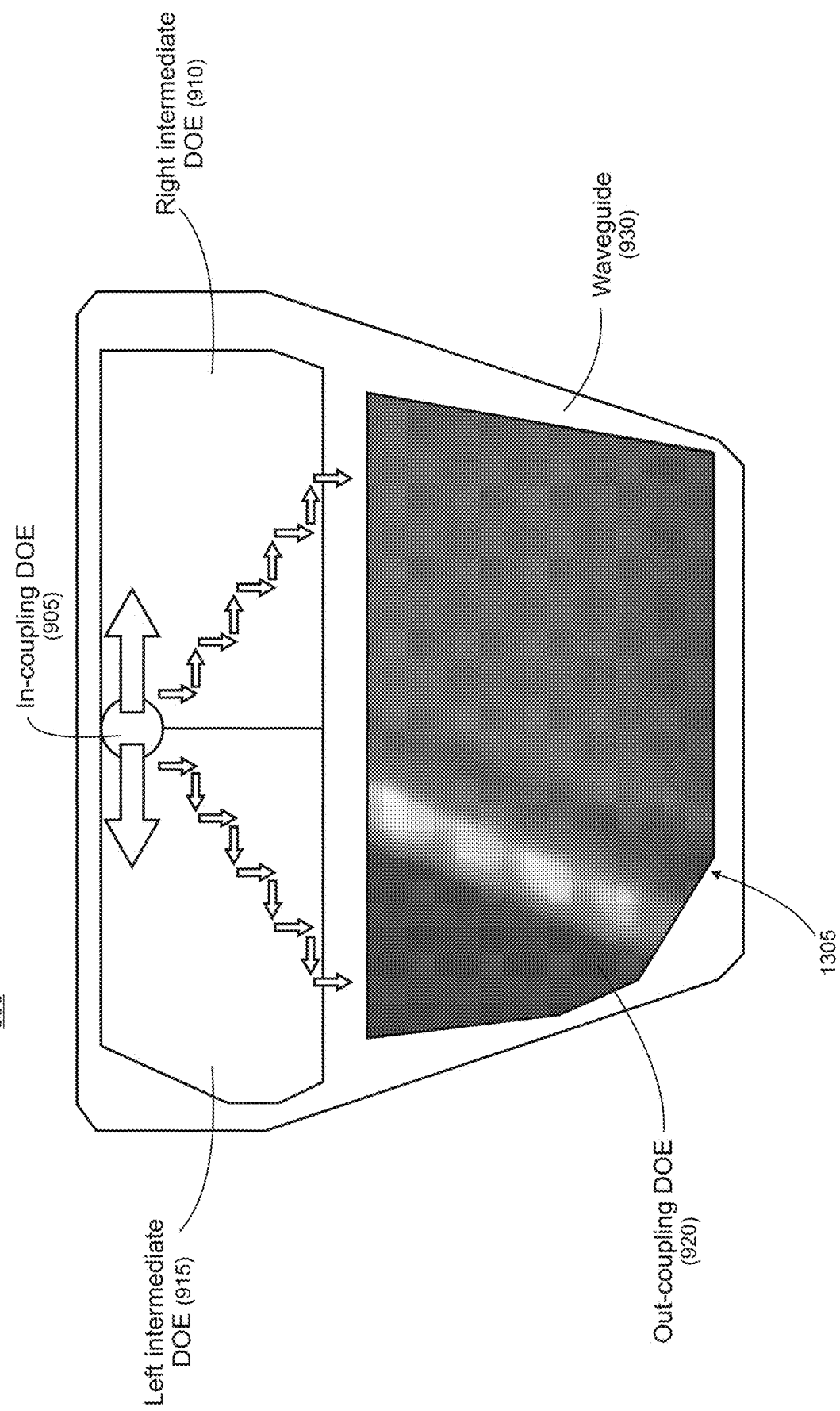
FIG. 13 shows an illustrative depiction of light and dark bands that are visible at some angles within the FOV of a waveguide display.

Because the in-coupling DOE is configured to avoid coupling image light directly downwards, the intermediate DOEs are configured to enable light to be spread back towards the center region of the waveguide. Otherwise, as shown in FIG. 13, banding and/or dark stripes (indicated by reference numeral 1305) can appear in the out-coupling DOE 920 below the in-coupling DOE 905 where light is absent.

Figure 14:
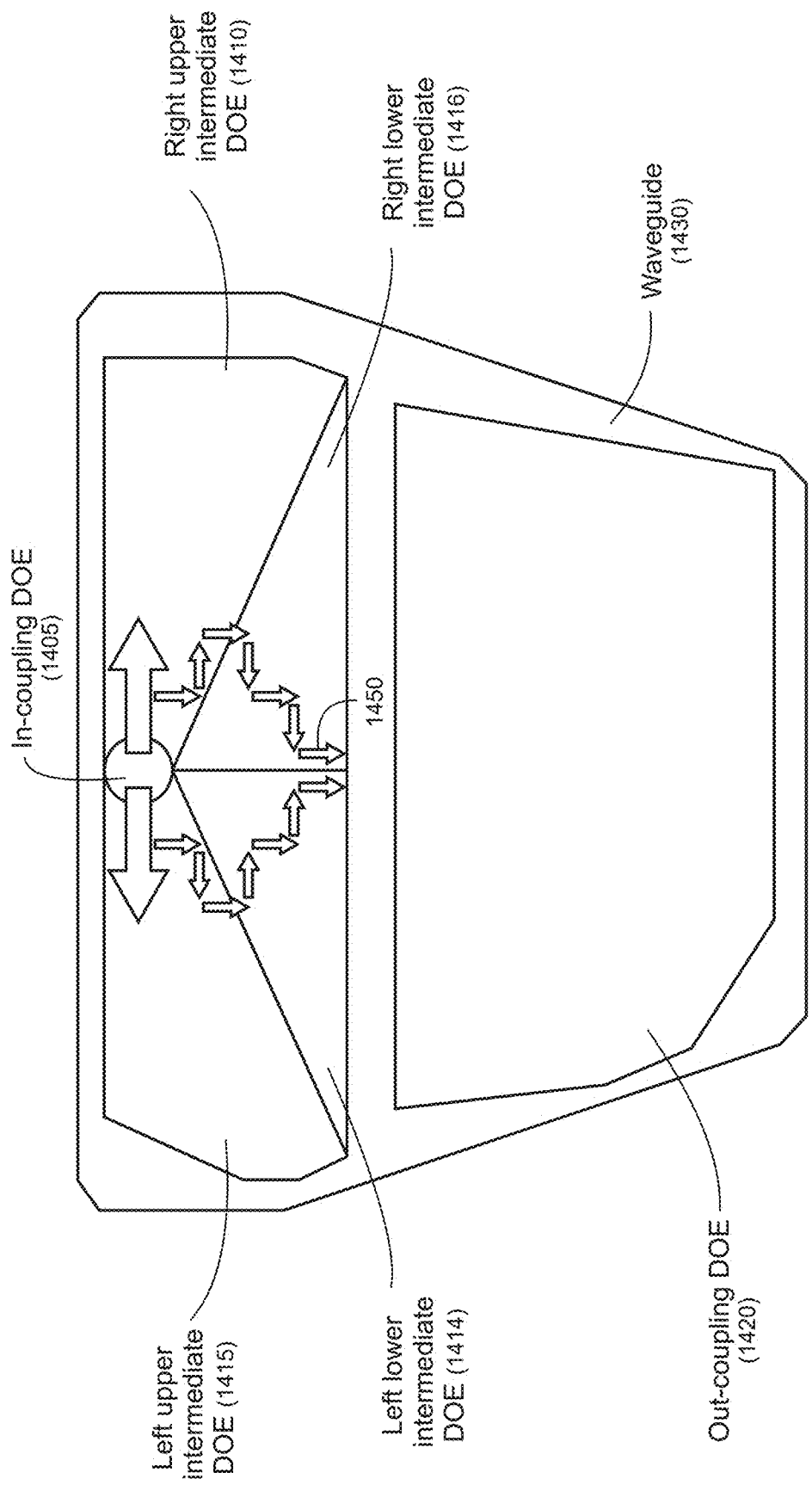
FIG. 14 shows an illustrative arrangement in which intermediate DOEs comprise upper and lower portions that facilitate spreading of image light towards the center of the waveguide display.

FIG. 14 shows a waveguide display 1400 that uses an arrangement of multiple DOEs on a waveguide 1430. An in-coupling DOE 1405, which can comprise one-sided or two-sided split-slant grating, is configured to couple image light from an imager sideways to the left and right to respective intermediate DOEs. The intermediate DOEs comprise two parts or portions—an upper portion adjacent to the in-coupling DOE and a lower portion that is adjacent to a single out-coupling DOE 1420. Thus, as shown, four intermediate DOEs are utilized—a right upper intermediate DOE 1410, a right lower intermediate DOE 1416, a left upper intermediate DOE 1415, and left lower intermediate DOE 1414. The intermediate DOEs are configured to provide an expanded exit pupil in a first direction for left and right portions of the FOV of the image light. The out-coupling DOE 1420 provides exit pupil expansion in a second direction and out-couples image light to the user's eye across the full FOV.

In this illustrative example, a grating vector of the left lower intermediate DOE 1414 has a direction that is the same, or is almost the same, as the grating vector of the right upper intermediate DOE 1410. This alignment of grating vectors enables light to be guided back to the center of the waveguide 1430, as shown by the arrows (representatively indicated by reference numeral 1450). In an alternative implementation, the left and right lower intermediate DOEs can be combined and be configured as two-sided gratings with grating features on both sides. One surface has a grating vector with the same or similar direction as that of the right upper intermediate DOE 1410. The opposite surface has a grating vector with the same or similar direction as that of the left upper intermediate DOE 1415. In another alternative implementation, a combined left and right lower intermediate DOE may be configured as a one-sided or two-sided crossed grating.

Figure 15:
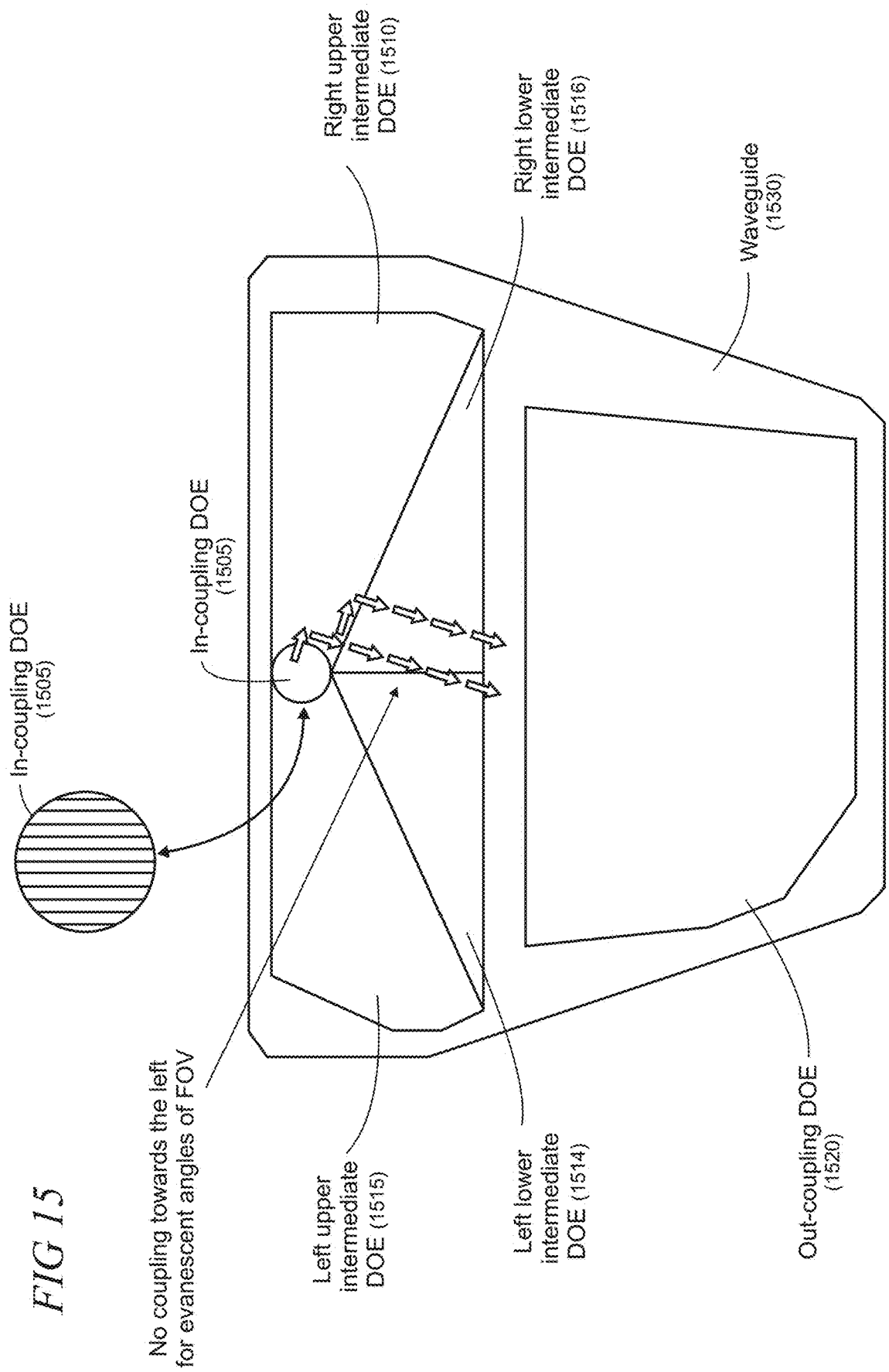
FIG. 15 shows an illustrative arrangement using a single or dual sided in-coupling DOE that couples image light downward without coupling image light towards the left for certain angles within the FOV.

The waveguide display 1400 with left and right, upper and lower intermediate DOEs can provide increased display uniformity from reduced cross-coupling (e.g., red light into the green waveguide plate). However, some angles within the FOV may be evanescent within the waveguide which can lead to dark regions from some eye positions. While some improvement can be realized by increasing the distance between the in-coupling and out-coupling DOEs, this may be sub-optimal in some implementations due to increased waveguide plate size. For example, as shown in FIG. 15 when using a single- or dual-sided in-coupling DOE 1505, incident image light is not coupled to the left as some FOV angles are evanescent within the waveguide 1530.

Figure 16:
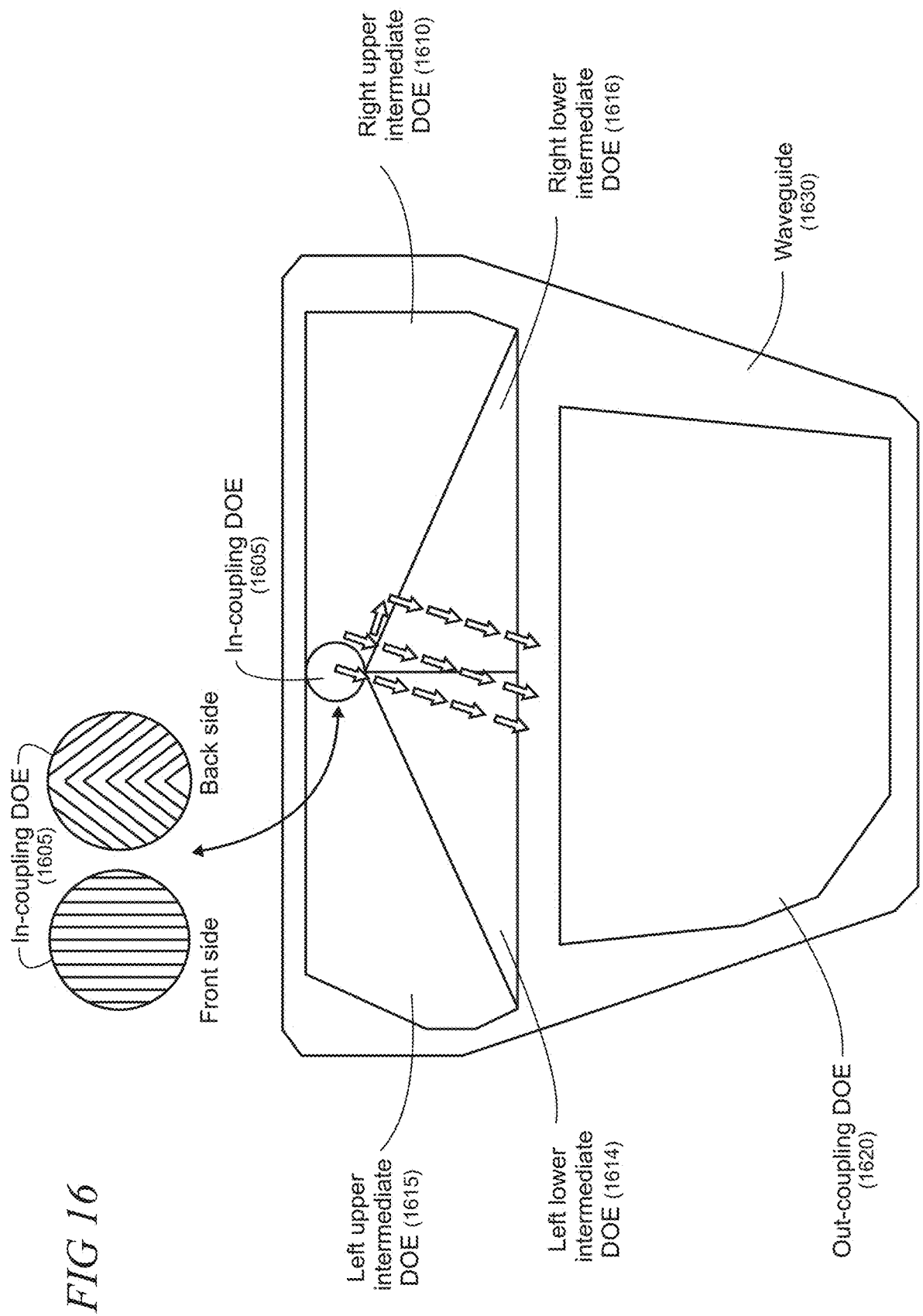
FIG. 16 shows an illustrative arrangement using a dual sided in-coupling DOE that enables image light to be coupled downwards but without cross-coupling between color components.

The lack of leftward coupling may be addressed by using an in-coupling DOE 1605, as shown in FIG. 16, that includes linear grating features in a parallel configuration on a first surface of a two-sided in-coupling DOE 1605 and linear grating features in chevron configuration on the second surface on the opposite side. The directions of the grating vectors are different for the first and second surfaces of the in-coupling DOE. The first (e.g., front) surface couples incident image light while the second (e.g., back) surface steers in-coupled light at the first diffraction order downwards, but as zeroth diffraction order waves are evanescent, they are not coupled downwards. Since light must go through the first diffraction order, this configuration enables coupling of the light downwards without the cross-coupling of red light into the green waveguide plate since the red light is evanescent.

Figure 17:
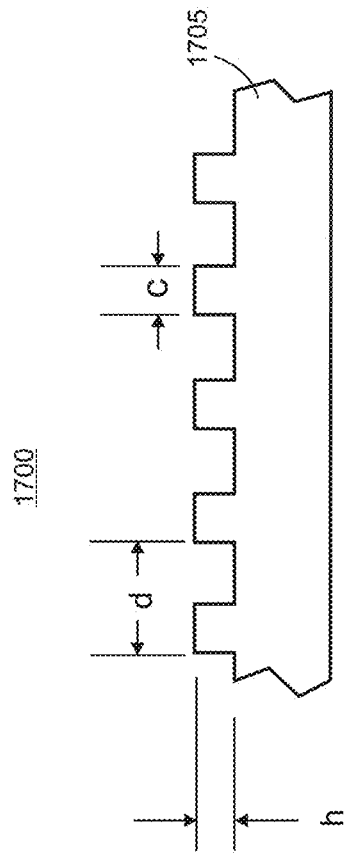
FIG. 17 shows a profile of a portion of an illustrative diffraction grating that has straight gratings.
Figure 18:
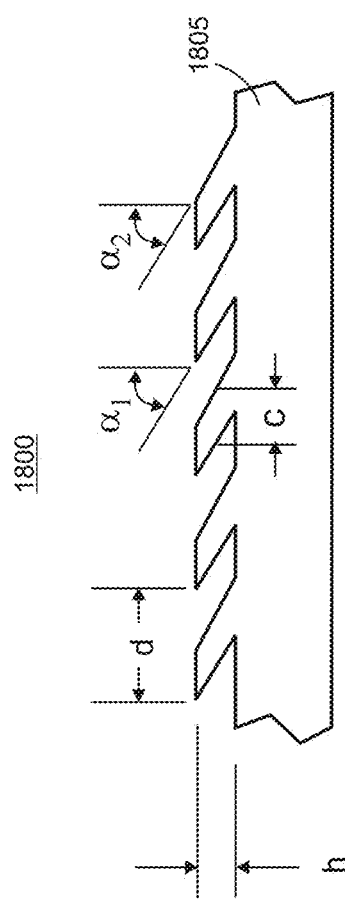
FIG. 18 shows an asymmetric profile of a portion of an illustrative diffraction grating that has asymmetric or slanted gratings.

The grating features used in the DOEs in the present waveguide display with increased uniformity and reduced cross-coupling between colors may take various suitable forms. For example, FIG. 17 shows a profile of straight (i.e., non-slanted) grating features 1700 (referred to as grating bars, grating lines, or simply "gratings"), that are formed in a substrate 1705. By comparison, FIG. 18 shows grating features 1800 formed in a substrate 1805 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles. In FIGS. 17 and 18, the grating period is represented by d, the grating height by h, bar width by c, and the filling factor by f, where f=c/d. The slanted gratings in FIG. 18 may be described by slant angles $\alpha_1$ and $\alpha_2$.

FIGS. 19-22 show various illustrative two-dimensional (2D) diffraction gratings which may be utilized in some implementations of the in-coupling DOE. The 2D grating may also be utilized to impart polarization sensitivity to a DOE (e.g., an in-coupling DOE and/or an intermediate DOE). The 2D gratings in the FIGS. 19-22 are intended to be illustrative and not limiting, and it is contemplated that variations from the 2D gratings shown may also be utilized. Gratings may include symmetric and/or asymmetric features including slanted gratings (i.e., gratings having walls that are non-orthogonal according to one or more predetermined angles to a plane of the waveguide) and blazed gratings (i.e., gratings having asymmetric triangular or sawtooth profiles) in some cases. Various suitable surface relief contours, filling factors, grating periods, and grating dimensions can also be utilized according to the needs of a particular implementation.

Figure 19:
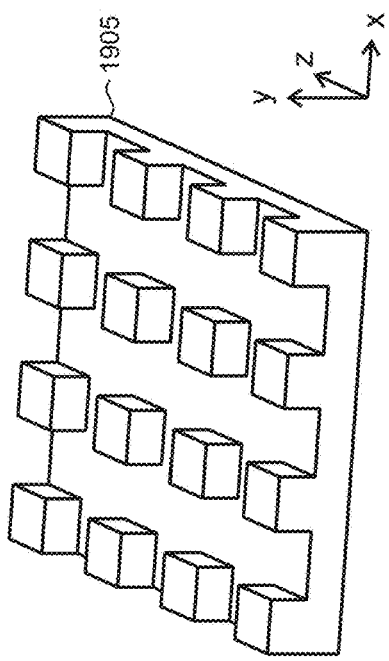
FIGS. 19-22 show various illustrative two-dimensional diffraction gratings.
Figure 20:
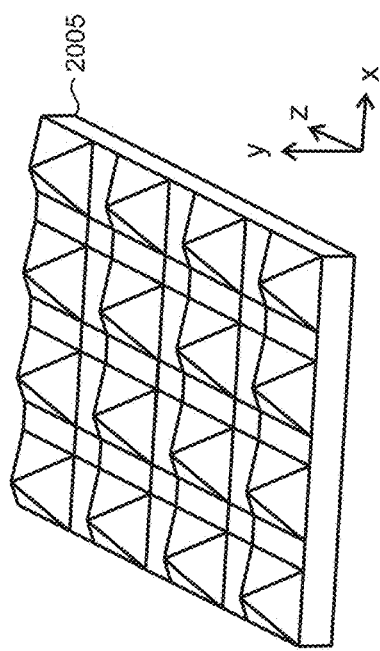
Figure 21:
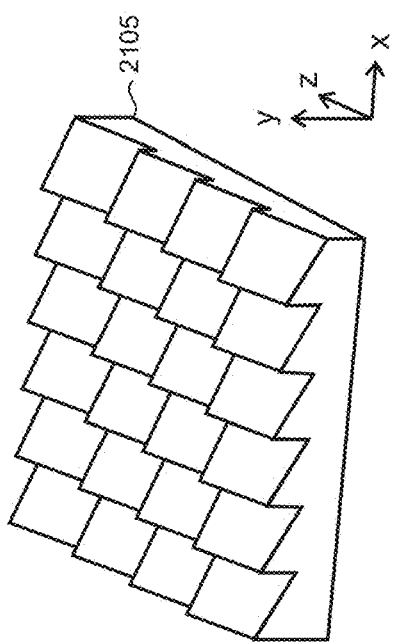
Figure 22:
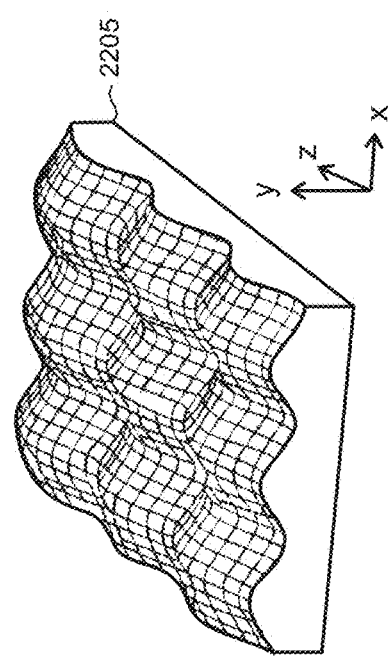

FIG. 19 shows a 2D grating 1905 that includes quadrangular elements that project from a substrate. The quadrangular elements can also be configured to be asymmetric such as being slanted or blazed. Non-quadrangular three-dimensional geometries (both symmetric and asymmetric) may also be utilized for a 2D grating including, for example, cylindrical elements, polygonal elements, elliptical elements, or the like. For example, FIG. 20 shows a 2D grating 2005 that includes pyramidal elements, and FIG. 21 shows a 2D grating 2105 that includes elements that have a blazed profile in each of the x and z directions. Gratings may also have elements with curved profiles, as shown in the illustrative 2D grating 2205 in FIG. 22.

Figure 23:
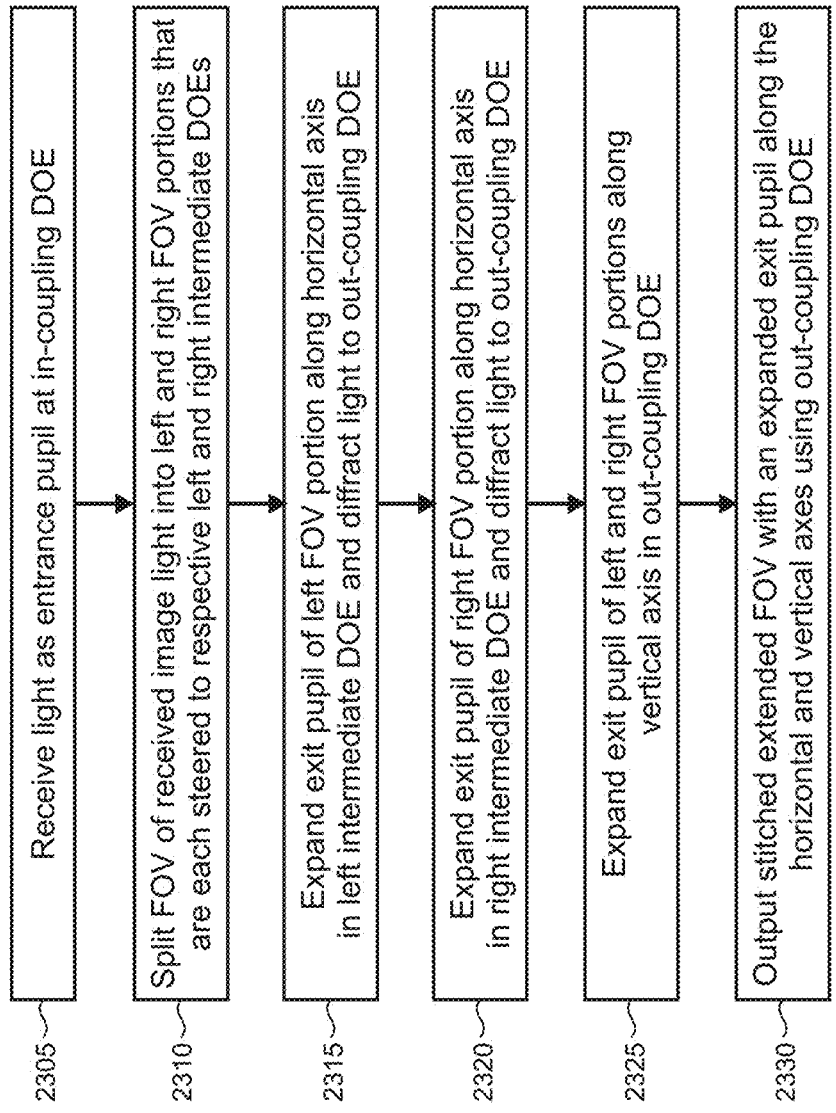
FIG. 23 shows an illustrative method.

FIG. 23 is a flowchart of an illustrative method 2300. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At step 2305, image light from an imager is received as an entrance pupil at an in-coupling DOE. At step 2310, the FOV of the received image light is split into left and right FOV portions at the in-coupling DOE. The left and right FOV portions of the received image light is steered by the in-coupling DOE to respective left and right intermediate DOEs.

At step 2315, the left FOV portion of the in-coupled image light is propagated in the left intermediate DOE so that an exit pupil of the left FOV portion is expanded along the horizontal axis and the light is diffracted downward along the vertical axis to an out-coupling DOE. At this step, a red component of the image light is evanescent and thus is non-propagating along the vertical axis in the left intermediate DOE. At step 2320, the right FOV portion of the in-coupled image light is propagated in the right intermediate DOE so that the exit pupil of the right FOV portion is expanded along the horizontal axis and the light is diffracted downward along the vertical axis to the out-coupling DOE.

At step 2325, an exit pupil of the left and right FOV portions of the propagating image light is expanded along the vertical axis in the out-coupling DOE. At step 2330, image light for the left and right FOV portions is output from the out-coupling DOE. The output image light has expanded pupil relative to the entrance pupil along the horizontal and vertical axes. The out-coupling DOE operates to optically stitch the left and right FOV portions together to provide a full FOV that is extended (i.e., having a larger angular FOV) compared to conventional optical displays.

Figure 24:
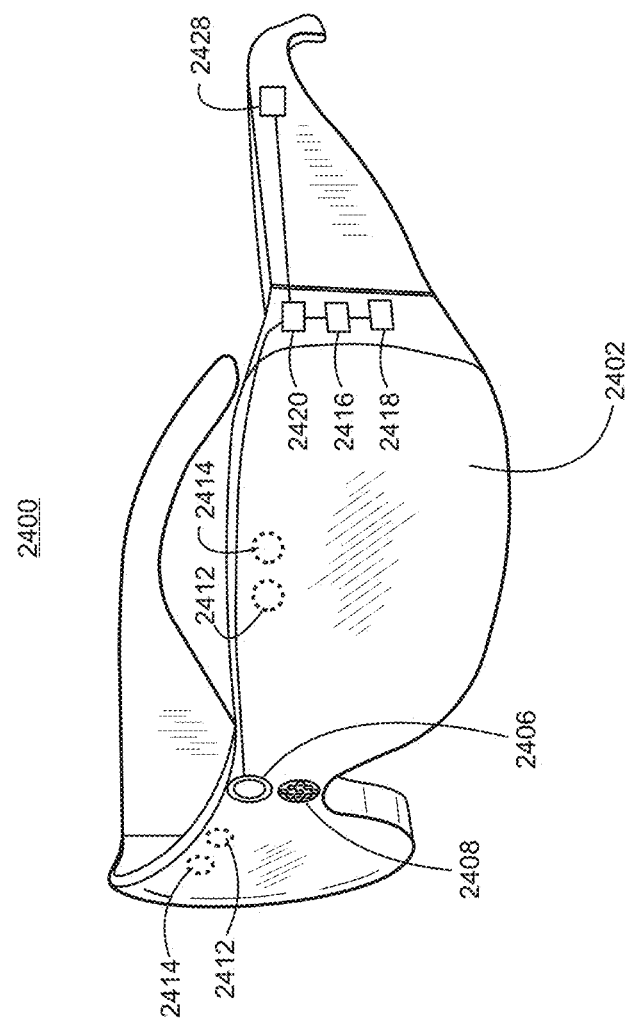
FIG. 24 is a pictorial view of an illustrative example of a virtual reality or mixed reality HMD device.
Figure 25:
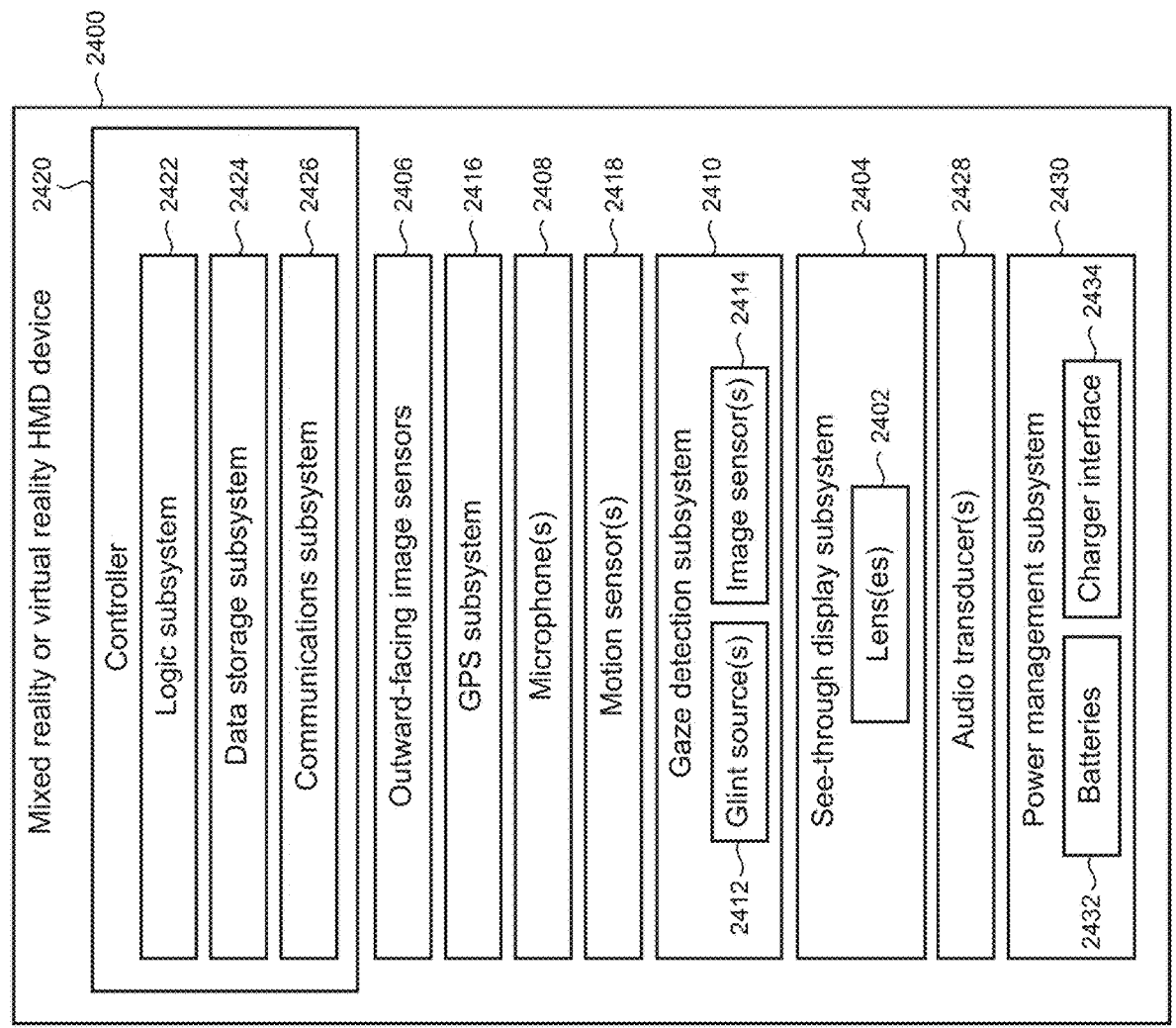
FIG. 25 shows a block diagram of an illustrative example of a virtual reality or mixed reality HMD device.

FIG. 24 shows one particular illustrative example of a see-through, mixed reality or virtual reality HMD device 2400, and FIG. 25 shows a functional block diagram of the device 2400. HMD device 2400 comprises one or more lenses 2402 that form a part of a see-through display subsystem 2404, so that images may be displayed using lenses 2402 (e.g. using projection onto lenses 2402, one or more waveguide systems, such as a near-eye display system, incorporated into the lenses 2402, and/or in any other suitable manner). HMD device 2400 further comprises one or more outward-facing image sensors 2406 configured to acquire images of a background scene and/or physical environment being viewed by a user, and may include one or more microphones 2408 configured to detect sounds, such as voice commands from a user. Outward-facing image sensors 2406 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The HMD device 2400 may further include a gaze detection subsystem 2410 configured for detecting a direction of gaze of each eye of a user or a direction or location of focus, as described above. Gaze detection subsystem 2410 may be configured to determine gaze directions of each of a user's eyes in any suitable manner. For example, in the illustrative example shown, a gaze detection subsystem 2410 includes one or more glint sources 2412, such as infrared light sources, that are configured to cause a glint of light to reflect from each eyeball of a user, and one or more image sensors 2414, such as inward-facing sensors, that are configured to capture an image of each eyeball of the user. Changes in the glints from the user's eyeballs and/or a location of a user's pupil, as determined from image data gathered using the image sensor(s) 2414, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2410 may have any suitable number and arrangement of light sources and image sensors. In some implementations, the gaze detection subsystem 2410 may be omitted.

The HMD device 2400 may also include additional sensors. For example, HMD device 2400 may comprise a global positioning system (GPS) subsystem 2416 to allow a location of the HMD device 2400 to be determined. This may help to identify real-world objects, such as buildings, etc. that may be located in the user's adjoining physical environment.

The HMD device 2400 may further include one or more motion sensors 2418 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 2406. The use of motion data may allow changes in gaze location to be tracked even if image data from outward-facing image sensor(s) 2406 cannot be resolved.

In addition, motion sensors 2418, as well as microphone(s) 2408 and gaze detection subsystem 2410, also may be employed as user input devices, such that a user may interact with the HMD device 2400 via gestures of the eye, neck and/or head, as well as via verbal commands in some cases. It may be understood that sensors illustrated in FIGS. 24 and 25 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2400 can further include a controller 2420 such as one or more processors having a logic subsystem 2422 and a data storage subsystem 2424 in communication with the sensors, gaze detection subsystem 2410, display subsystem 2404, and/or other components through a communications subsystem 2426. The communications subsystem 2426 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2424 may include instructions stored thereon that are executable by logic subsystem 2422, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2400 is configured with one or more audio transducers 2428 (e.g., speakers, earphones, etc.) so that audio can be utilized as part of a mixed reality or virtual reality experience. A power management subsystem 2430 may include one or more batteries 2432 and/or protection circuit modules (PCMs) and an associated charger interface 2434 and/or remote power interface for supplying power to components in the HMD device 2400.

It may be appreciated that the HMD device 2400 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 26:
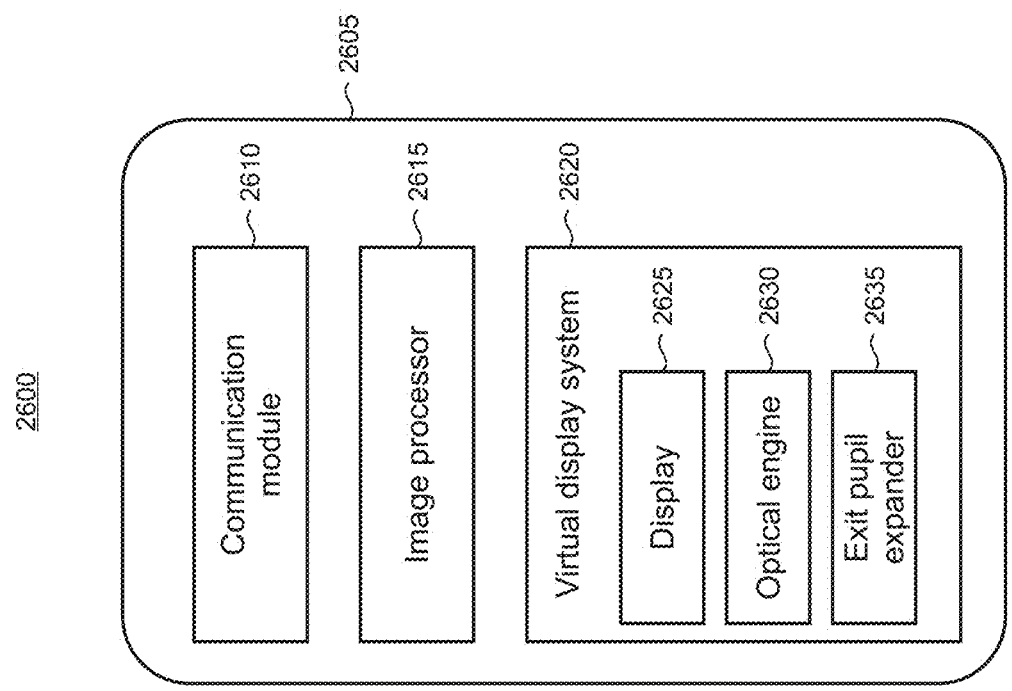
FIG. 26 shows a block diagram of an illustrative electronic device that incorporates an exit pupil expander.

As shown in FIG. 26, near-eye display systems with waveguide displays having increased uniformity and reduced cross-coupling between colors can be used in a mobile or portable electronic device 2600, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 2600 includes a housing 2605 to house a communication module 2610 for receiving and transmitting information from and to an external device, or a remote system or service (not shown).

The portable device 2600 may also include an image processor 2615 using one or more processors for handling the received and transmitted information, and a virtual display system 2620 to support viewing of images. The virtual display system 2620 can include a micro-display or an imager 2625 and an optical engine 2630. The image processor 2615 may be operatively connected to the optical engine 2630 to provide image data, such as video data, to the imager 2625 to display an image thereon. An EPE 2635 can be optically linked to an optical engine 2630. The EPE may utilize a waveguide display having increased uniformity and reduced cross-coupling between colors as described herein.

Waveguide displays having increased uniformity and reduced cross-coupling between colors may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present waveguide display with increased uniformity and reduced cross-coupling between colors are now presented by way of illustration and not as an exhaustive list of all embodiments. An example includes a near-eye display system configured to provide image light from an imager within a field of view (FOV) having first and second axes, to an eye of a user of the near-eye display system, comprising: a substrate of optical material configured as a waveguide for guiding image light in the near-eye display system; an in-coupling diffractive optical element (DOE) disposed on the substrate and configured to couple image light over an entirety of the FOV into the waveguide; a left intermediate DOE disposed on the substrate and optically coupled to the in-coupling DOE to receive image light for a left portion of the FOV, in which the left intermediate DOE is configured to expand the received image light along the first axis; a right intermediate DOE disposed on the substrate and optically coupled to the in-coupling DOE to receive image light for a right portion of the FOV, in which the right intermediate DOE is configured to expand the received image light along the first axis; and an out-coupling DOE disposed on the substrate and configured to receive the image light for the left and right portions of the FOV respectively from the left and right intermediate DOEs, the out-coupling DOE configured for pupil expansion of the image light for each of the left and right portions of the FOV along the second axis, and further configured to out-couple image light for combined left and right portions over the entirety of the FOV from the waveguide, wherein the left intermediate DOE includes a top portion and a bottom portion, the top portion disposed in the waveguide adjacent to the in-coupling DOE, and the bottom portion disposed in the waveguide adjacent to the out-coupling DOE, and wherein the right intermediate DOE includes a top portion and a bottom portion, the top portion disposed in the waveguide adjacent to the in-coupling DOE, and the bottom portion disposed in the waveguide adjacent to the out-coupling DOE.

In another example, the left intermediate DOE and right intermediate DOE each interface with the in-coupling DOE around respective portions the of in-coupling DOE's perimeter. In another example, the in-coupling DOE is centrally located between the left intermediate DOE and right intermediate DOE. In another example, a left upper intermediate DOE laterally extends from the in-coupling DOE and a right upper intermediate DOE laterally extends from the in-coupling DOE. In another example, the substrate is planar. In another example, the left and right intermediate DOEs are disposed on opposite sides of the substrate. In another example, the in-coupling DOE comprises a front side and a back side that are disposed on opposite sides of the substrate, the front side and back side having respective grating vectors with different directions.

A further example includes an electronic device configured for displaying image light for virtual images in a full field of view (FOV) comprising a first partial FOV and a second partial FOV, the full FOV having horizontal and vertical directions, comprising: a waveguide on which multiple diffractive optical elements (DOEs) are disposed, the waveguide comprising a plurality of plates configured to respectively guide red, green, and blue color components of the image light; an in-coupling DOE disposed on the waveguide and configured with grating features on a first portion of the in-coupling DOE and grating features on a second portion of the in-coupling DOE, the grating features on the first portion having different grating vectors from grating features on the second portion, the grating features on the first portion configured to in-couple image light into the waveguide and the grating features on the second portion configured to steer the in-coupled image light in the vertical direction while minimizing cross-coupling among the color components; a first intermediate DOE configured to expand the first partial FOV in the horizontal direction; and a second intermediate DOE configured to expand the second partial FOV in the horizontal direction.

In another example, the first portion comprises a first surface and the second portion comprises a second surface and the in-coupling DOE is configured as a two-sided DOE and the first and second surfaces are located on opposing sides. In another example, the grating features on the first or second surface of the in-coupling DOE are arranged in a split-slant configuration. In another example, the grating features on the first or second surface of the in-coupling DOE are arranged as one of refraction index-modulated, refraction index-switchable, or polarization-sensitive gratings. In another example, the electronic device further includes an out-coupling DOE disposed on the waveguide and configured to expand the image light for each of the first and second partial FOVs in the vertical direction and further to out-couple image light from the waveguide across the full FOV with an expanded exit pupil in the horizontal and vertical directions. In another example, the first intermediate DOE comprises a first portion disposed in the waveguide adjacent to the in-coupling DOE and a second portion disposed in the waveguide adjacent to the out-coupling DOE and the second intermediate DOE comprises a first portion disposed in the waveguide adjacent to the in-coupling DOE and a second portion disposed in the waveguide adjacent to the out-coupling DOE. In another example, the first portion of the first intermediate DOE and the second portion of the second intermediate DOE share a common grating vector direction.

A further example includes a method of operating a waveguide display with left, right, top, and bottom boundaries and vertical and horizontal axes, comprising: receiving image light having an entrance pupil within a full field of view (FOV) at an in-coupling diffractive optical element (DOE) disposed in a waveguide, the image light having red, green, and blue components; using the in-coupling DOE, splitting the FOV of the received image light into a left FOV portion and a right FOV portion; using the in-coupling DOE, steering the left FOV portion of the in-coupled image light horizontally to the left and steering the right FOV portion of the in-coupled image light horizontally to the right; propagating the left FOV portion of the in-coupled image light in a left intermediate DOE disposed in the waveguide in which an exit pupil of the left FOV portion is expanded along the horizontal axis and diffracted downward along the vertical axis to an out-coupling DOE, wherein a red component of the image light is evanescent and non-propagating along the vertical axis; propagating the right FOV portion of the in-coupled image light in a right intermediate DOE disposed in the waveguide in which an exit pupil of the right FOV portion is expanded along the horizontal axis and diffracted downward along the vertical axis to the out-coupling DOE; expanding the exit pupil of the left and right FOV portions of the propagating image light along the vertical axis in the out-coupling DOE disposed in the waveguide; and outputting image light for the left and right FOV portions with an expanded exit pupil relative to the entrance pupil at the in-coupling DOE along the horizontal and vertical axes using the out-coupling DOE.

In another example, image light propagates in opposite directions in the left and right intermediate DOEs or the image light propagates with orthogonal states of polarization in the left and right intermediate DOEs. In another example, the in-coupling DOE is centrally disposed on an exit pupil expander and the left and right intermediate DOEs extend laterally from the in-coupling DOE on the exit pupil. In another example, the method further includes stitching the left and right FOV portions together to provide a full FOV at the out-coupling DOE. In another example, the stitched FOV portions are in one of symmetric or asymmetric configuration in the full FOV. In another example, the splitting comprises selection of the FOV propagation based on evanescent diffraction order.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of operating a waveguide display with left, right, top, and bottom boundaries and vertical and horizontal axes, comprising:
    receiving image light having an entrance pupil within a full field of view (FOV) at an in-coupling diffractive optical element (DOE) disposed in a waveguide, the image light having red, green, and blue components, wherein the waveguide comprises a stack of three waveguide plates in which each waveguide plate in the stack propagates a respective one of the red, green, and blue components of the image light;
    using the in-coupling DOE, splitting the full FOV of the received image light into a left FOV portion and a right FOV portion, in which the left FOV and right FOV portions are unique angular portions of the full FOV;
    using the in-coupling DOE, steering the left FOV portion of the in-coupled image light horizontally to the left and steering the right FOV portion of the in-coupled image light horizontally to the right;
    propagating the left FOV portion of the in-coupled image light in a left intermediate DOE disposed in the waveguide in which an exit pupil of the left FOV portion is expanded along the horizontal axis and diffracted downward along the vertical axis to an out-coupling DOE, wherein a red component of the image light has zeroth diffraction order and is non-propagating along the vertical axis;
    propagating the right FOV portion of the in-coupled image light in a right intermediate DOE disposed in the waveguide in which an exit pupil of the right FOV portion is expanded along the horizontal axis and diffracted downward along the vertical axis to the out-coupling DOE;
    combining the left and right FOV portions of the propagating image light in the out-coupling DOE into image light having the full FOV;
    expanding the exit pupil of the combined left and right FOV portions of the propagating image light along the vertical axis in the out-coupling DOE disposed in the waveguide; and
    outputting the image light for the combined left and right FOV portions having the full FOV with an expanded exit pupil relative to the entrance pupil at the in-coupling DOE along the horizontal and vertical axes using the out-coupling DOE.

2. The method of claim 1 in which image light propagates in opposite directions in the left and right intermediate DOEs or the image light propagates with orthogonal states of polarization in the left and right intermediate DOEs.

3. The method of claim 1 in which the in-coupling DOE is centrally disposed on an exit pupil expander and the left and right intermediate DOEs extend laterally from the in-coupling DOE on the exit pupil.

4. The method of claim 1 further including stitching the left and right FOV portions together to provide a full FOV at the out-coupling DOE.

5. The method of claim 4 in which the stitched FOV portions are in one of symmetric or asymmetric configuration in the full FOV.

6. The method of claim 1 in which the splitting comprises selection of the FOV propagation based on evanescent diffraction order.

* * * * *